United States Patent [19]
Ibenthal et al.

[11] Patent Number: 6,044,114
[45] Date of Patent: Mar. 28, 2000

[54] METHOD OF IMAGE SEGMENTATION

[75] Inventors: Achim Ibenthal, Elmshorn; Sven Siggelkow, Lüneburg; Rolf-Rainer Grigat, Halstenbek, all of Germany

[73] Assignee: U.S. Philips Corporation, New York, N.Y.

[21] Appl. No.: 08/838,488

[22] Filed: Apr. 7, 1997

[30] Foreign Application Priority Data

Apr. 19, 1996 [DE] Germany .......................... 196 15 492

[51] Int. Cl.$^7$ ...................................... H04N 7/36
[52] U.S. Cl. .................. 375/240; 348/416; 348/420; 348/699
[58] Field of Search ..................... 348/699, 700, 348/407, 413, 416, 420; 375/240; H04N 7/36

[56] References Cited

U.S. PATENT DOCUMENTS 5,912,706 6/1999 Kikuchi ................................. 348/401

OTHER PUBLICATIONS

Philippe Salembier et al, "Region–Based Video Coding Using Mathematical Morphology", Proceedings of the IEEE, vol. 83, No. 6, pp. 843–857, Jun. 1995.

Robert M. Haralick et al, "Image Segmentation Techinques, Computer Vision, Graphics, and Image Processing", vol. 29, pp. 100–132, 1985.

*Primary Examiner*—Howard Britton

[57] ABSTRACT

For time-sequential segment tracing, also of moving regions, a method of segmenting time-sequential images of a picture signal, in which, within an image, the image is split up into regions during its segmentation, and in which adjacent pixels having similar luminance and/or chrominance values are associated with a region is characterized in that it is attempted in time-sequential images to retrace regions of an image $I_n$ in a subsequent image $I_{n+1}$ by performing a motion estimation of the regions of the image $I_n$, in that the new position of the region in the image $I_{n+1}$ is determined with reference to the motion vectors determined for each region by means of the motion estimation, in that subsequently the displaced regions are adapted to the image contents of the image $I_{n+1}$, and in that pixels of the image $I_{n+1}$ not covered by these adapted regions are added to one of these regions or to newly formed regions.

11 Claims, 2 Drawing Sheets

METHOD OF IMAGE SEGMENTATION

BACKGROUND OF THE INVENTION

The invention relates to a method of segmenting time-sequential images of a picture signal, in which, within an image, the image is split up into regions during its segmentation, and in which adjacent pixels having similar luminance and/or chrominance values are associated with a region.

A method in which segmentation within each image of a picture signal is performed is known from "Image Segmentation Techniques, Computer Vision, Graphics, and it Image Processing" by Robert M. Haralick, Linda G. Shapiro, Vol. 29, pp. 100–132, 1985. The segmentation is performed as a division of each image into regions whose associated pixels have similar luminance and/or chrominance values. In this known method, similar contents of consecutive images are not taken into account.

Another method, in which a different segmentation technique is used, is known from "Region-based video coding using mathematical morphology", by Philippe Salembier, Luis Torres, Fernand Meyer, Chuang Gu, Proceedings of the IEEE, Vol. 83, No. 6, pp. 843–857, June 1995. In this method, it is attempted to utilize similar image contents of consecutive images. However, this method fails when there is motion in the image contents.

SUMMARY OF THE INVENTION

It is an object of the invention to improve the method described in the opening paragraph in such a way that regions in consecutive images can also be retraced when there is motion and that a transfer of the segmentation between consecutive images is possible.

According to the invention, this object is solved in that it is attempted in time-sequential images to retrace regions of an image $I_n$ in a subsequent image $I_{n+1}$ by performing a motion estimation of the regions of the image $I_n$, in that the new position of the region in the image $I_{n+1}$ is determined with reference to the motion vectors determined for each region by means of the motion estimation, in that subsequently the displaced regions are adapted to the image contents of the image $I_{n+1}$, and in that pixels of the image $I_{n+1}$ not covered by these adapted regions are added to one of these regions or to newly formed regions.

Regions which are present in an image $I_n$ are subjected to a known method of motion estimation. In this way, motion vectors are determined by means of which the displacement of a region in the image $I_{n+1}$ relative to the position of the region in the image $I_n$ can be determined. The position of the region in the image $I_{n+1}$ is then known. This region is subsequently traced in the image $I_{n+1}$, i.e. it is treated as a displaced region. The values formed for the region in the image $I_n$ and also the size and shape of the region can then be taken over. However, because of the displacement of the region, pixels other than those in the image $I_n$ are associated with the image $I_{n+1}$. This yields the advantage that the region in the image $I_{n+1}$ does not have to be formed again, so that an elaborate computation and hence time is saved in the encoding process.

Basically, this method may be used for all regions of an image $I_n$. In practice, a larger part of the regions of an image $I_n$ will be found back again in the image $I_{n+1}$.

Based on a current motion, new image contents may be produced due to shielding or camera panning. These new image contents are added to one of the regions which may be taken over from the previous image. If necessary, new regions may also be formed for these pixels which have not been covered.

During its segmentation, an image in an image sequence may thus have regions which are taken over, or are displaced, from the previous image. However, it may also comprise regions which have been newly formed or expanded. Each region, which may be taken over from the previous image, possibly in a displaced position, yields a reduction of the computation process. Moreover, such regions can be more easily encoded by way of prediction.

An embodiment of the invention is characterized in that, if several pixels of the image $I_n$ are imaged on a pixel in the image $I_{n+1}$ on the basis of motion of their regions, it is determined for each pixel which of the moved regions said pixel matches best in the image $I_{n+1}$ as regards its luminance and/or chrominance values.

On the basis of different motions, two regions of one image $I_n$ may be imaged on a common area or a partial area of an image $I_{n+1}$. A quasi-coverage of the two regions in the image $I_{n+1}$ then results. Since this is not admissible, it must be decided for each of the pixels, which are located in the overlapping area of the two regions, which of the moved regions it best matches in the image $I_{n+1}$ as regards its luminance and/or chrominance values. Thus, a decision as to which region each pixel matches best is taken in the overlapping area.

In a further embodiment of the method according to the invention, the motion vectors determined for the images $I_n$ and $I_{n+1}$ are compared with motion vectors additionally determined for the images $I_{n-1}$ and $I_n$, and, if significantly different motion vectors have been determined for a region during both motion estimations, the motion vectors for this region are considered to be invalid and the pixels of this region are added to one of the other displaced regions or to newly formed regions.

The above-described motion estimation between the images $I_n$ and $I_{n+1}$ may advantageously be performed for the images $I_{n-1}$ and $I_n$ as well. The consistency of a motion can thereby be estimated. If significantly different motion vectors resulted from the two motion estimations, this would be an indication that a motion estimation may have yielded erroneous values. This may happen, for example, when there are similar image contents. Thus, if these two motion estimations yield different motion vectors, the regions in the image $I_{n+1}$ will be newly formed, i.e. the regions of the image $I_{n+1}$ for which a motion has been determined on the basis of the motion estimation, will be given up.

In a further embodiment of the invention, it is checked for each pixel located at a border of its region whether its luminance and/or chrominance values are more similar to those pixels of a region with which its left, right, upper or lower neighbor is associated, and the pixel is possibly added to a found and better matching region.

In such an operation, the pixels of preferably the displaced regions are postprocessed in such a way that each adjacent pixel located to the left, right, above or below the relevant pixel is checked on its similarity with the relevant pixel. If a greater similarity with a pixel of another region is found, the pixel will be added to this region. The borders of the region are thereby adapted.

In accordance with a further embodiment of the invention, a merger of regions having similar luminance and/or chrominance values is performed for regions which are newly formed in the image $I_{n+1}$.

A merger of regions having similar luminance and/or chrominance values is performed for regions which are newly formed in the image $I_{n+1}$. However, this applies only to regions newly formed in the image, not to regions which have been taken over or are displaced.

In accordance with a further embodiment of the invention, regions falling below a predetermined minimum size are dissolved, and their pixels are added to other, possibly matching regions.

Regions which fall below a predetermined minimum size do not provide any noticeable advantages during encoding. Consequently, it is advantageous to dissolve them. The pixels of the dissolved region are added to other, possibly matching regions.

In accordance with a further embodiment of the invention, the minimum size which regions must have in order that they are not dissolved is larger for regions which are newly formed in the image $I_{n+1}$ than for displaced regions which have been taken over from the image $I_n$. For regions taken over from the image $I_n$, there is already a consistency of these regions so that they are only dissolved when they are very small. For regions newly formed in the image $I_{n+1}$, the minimum size is set to be larger because these regions must be recoded, i.e. they cannot be encoded predictively.

In a further embodiment of the invention, each region in the image $I_{n+1}$, which has resulted from a displacement from a region of the image $I_n$, is compared with its neighbors of the image $I_n$, and regions are combined with equal or similar regions of the image $I_n$.

In the motion estimation, it may occur that a region is initially split up into two regions, for example, because an object moves in front of the region. These regions would then be further treated as two regions. To avoid this, the regions in the image $I_{n+1}$, resulting from a displacement from regions of the image In, are compared with their neighbors. Regions which have equal predecessor regions in the image $I_n$ are combined. A region which was formed, for example, due to the above-mentioned circumstances, is then united again.

In a further embodiment of the invention, an edge detection with reference to the pixel values which are not associated with any of the regions displaced with respect to the image $I_n$, is performed before forming new regions in the image $I_{n+1}$, and, after formation of the new regions, pixels forming an edge are added to those new regions which they match best as regards their luminance and/or chrominance values.

For those regions which cannot be taken over by way of motion estimation from the image $I_n$ in the image $I_{n+1}$ and which are thus newly formed, an edge detection may additionally be performed. An edge detection locally yields very good results for the separation of several image areas. After the formation of the new regions, the edge detection may be used for the purpose of adding those pixels associated with an edge to one of the neighboring regions. That region is selected which, based on its luminance and/or chrominance values, matches best with the pixels of the edge.

In accordance with a further embodiment of the invention, a change of scenes is recognized in such a way that no motion estimation is performed and exclusively new regions are formed when the image contents of the image $I_{n+1}$ deviate considerably from the image $I_n$.

A scene or camera switch, or the like, may take place, for example, between images $I_n$ and $I_{n+1}$ of an image sequence. The image contents of these two images are then so different that regions found in the image $I_n$ cannot be retraced anyway in the image $I_{n+1}$. Consequently, it may be advantageous to recognize a scene change in which significantly different image contents of two consecutive images are detected. If significantly different image contents of the images are determined by means of this scene change recognition, then no motion estimation will be performed and only new regions are formed in the image $I_{n+1}$.

These and other aspects of the invention are apparent from and will be elucidated with reference to the embodiments described hereinafter.

DETAILED DESCRIPTION OF THE PREFERRED EMBODIMENT

Figure 1:
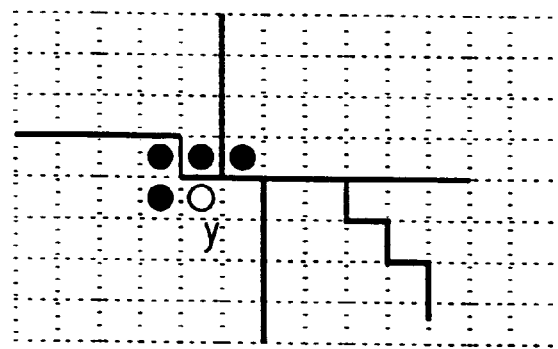
FIG. 1 shows a pattern for forming regions within an image.

FIG. 1 diagrammatically shows a pattern in which a new region is formed in an image in which no regions have been formed yet, or in image areas in which no displaced regions were found. To this end, it is checked for a pixel y shown diagrammatically in FIG. 1 in how far it has pixel values which are similar to the adjacent pixels shown as black dots in FIG. 1.

The separating lines shown in FIG. 1 indicate the segmentation which would result on the basis of the current luminance and/or chrominance values. The broken lines indicate the pixel raster. The pixel y would thus be added to the bottom left region in the example shown in FIG. 1.

For the pixel y, an adjacent region may be found with which this pixel value matches best as regards its luminance and/or chrominance values, i.e. to which it is most similar. In this way, all pixels of an image are covered line by line, so that, within an image, regions are formed with which adjacent pixels having similar luminance and/or chrominance values are associated.

In the prior-art method, such a formation of regions is performed individually in each image. It may also be attempted to retrace a formed region in a subsequent image. According to the invention, this retracing of a region from the image $I_n$ in an image $I_{n+1}$ is improved in that a motion estimation of the regions is performed. This will be further described hereinafter with reference to FIG. 2.

Figure 2:
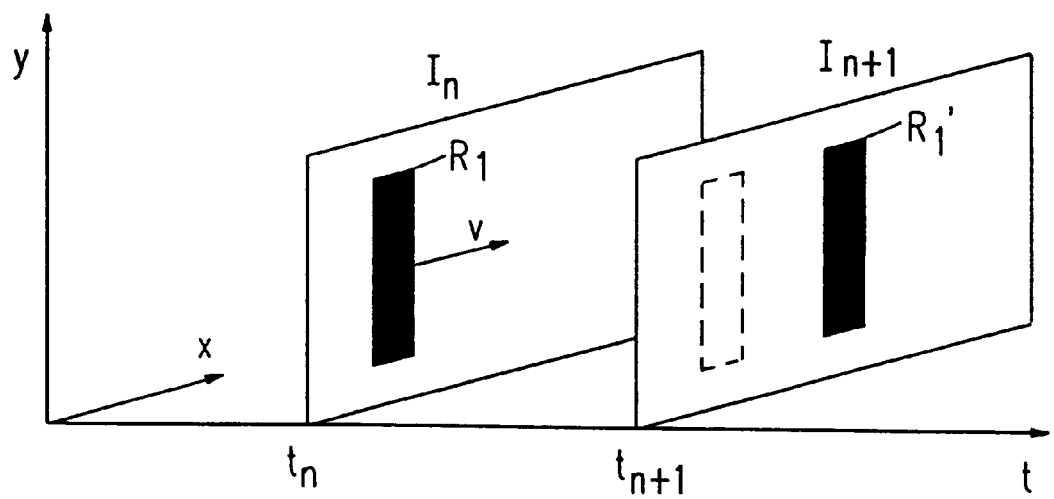
FIG. 2 shows diagrammatically two consecutive images with a displaced region.

FIG. 2 shows diagrammatically two consecutive images of an image sequence. An image $I_n$ is transmitted at an instant $t_n$. A region $R_1$ shown in black in the Figure was found in the image $I_n$. Further regions may of course have been found in the image $I_n$; for the sake of clarity, only the region $R_1$ is considered in this Figure.

The image $I_{n+1}$ was transmitted at an instant $t_{n+1}$. A motion of at least parts of the image contents is present between these two images of an image sequence. Consequently, the region $R_1$ of the image $I_n$ in the image $I_{n+1}$ will not appear at the expected, same position. Instead, the region appears as region $R_1'$ at a displaced position, due to a motion of the image contents.

Since a method of motion estimation according to the invention is used, this new position is found in the image $I_{n+1}$. A motion vector v is determined which determines the displacement of the position $R_1'$ in the image $I_{n+1}$ relative to the region $R_1$ in the image $I_n$. Based on this motion estimation and the motion vector determined thereby, the new position of the region $R_1'$ in the image $I_{n+1}$ is thus known. The values can then be taken over for this region. This applies both to the luminance and/or chrominance values and to the size, shape and expansion of the regions.

Figure 3:
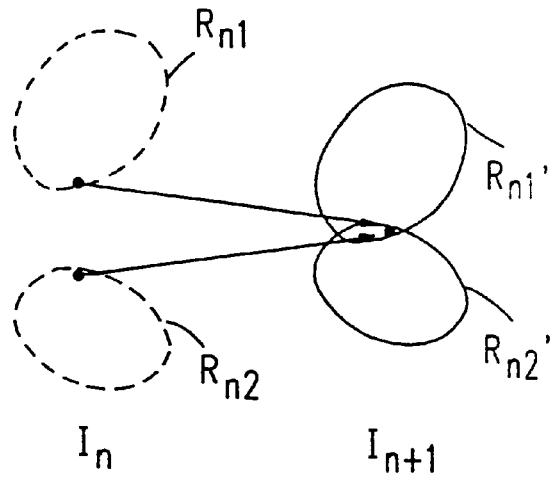
FIG. 3 shows diagrammatically an overlapping imaging of the segmentation of an image $I_n$ on an image $I_{n+1}$.

FIG. 3 shows diagrammatically a special case in which the regions $R_{n1}$ and $R_{n2}$ of an image $I_n$ are subjected to different motions. In the subsequent image $I_{n+1}$ shown diagrammatically in FIG. 3, this has the result that the regions partially overlap each other. The regions $R_{n1}'$ and $R_{n2}'$ now displaced in the image $I_{n+1}$ have common pixels. This is indicated by means of a black dot in FIG. 3.

Since such overlapping regions are not admissible, it is checked, according to the invention, for those pixels which would be associated with both regions $R_{n1}'$ and $R_{n2}'$, which of the two regions the pixels match best as regards their luminance and/or chrominance values, i.e. for which region they have the most similar values.

In coherent areas, these regions are added to one of the regions $R_n'$ or $R_{n2}'$. The overlapping area of the regions is thereby dissolved.

Figure 4:
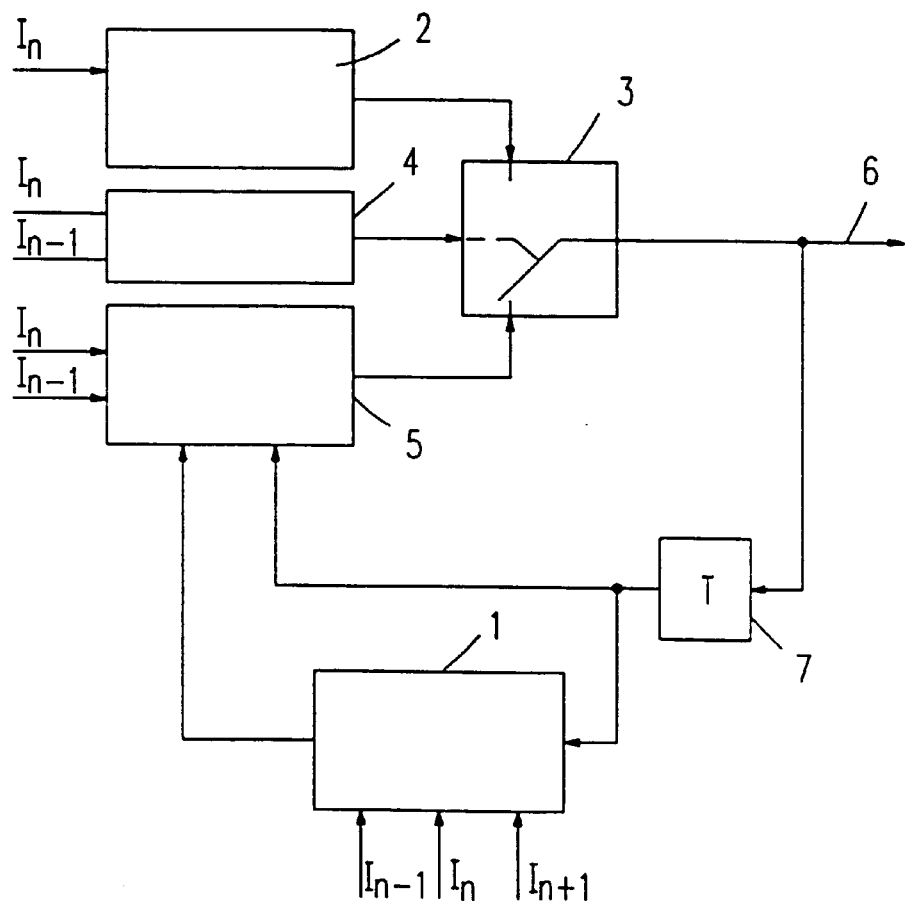
FIG. 4 shows diagrammatically a circuit arrangement for performing the method according to the invention.

FIG. 4 shows diagrammatically a block diagram of a circuit arrangement by means of which the inventive method of segmenting images in image sequences can be performed.

FIG. 4 shows a circuit block 1 for motion estimation. The data of three consecutive images $I_{n-1}$, $I_n$ and $I_{n+1}$ are applied to this circuit block.

FIG. 4 further shows a circuit block 2 for segmentation. The data of the image $I_n$ are applied to this circuit block. The output signal of the circuit block 2 is applied to a switch 3. Furthermore, a circuit block 4 for recognizing scene changes is provided. The data of the images $I_n$ and $I_{n-1}$ are applied to the circuit block, in which images the circuit of block 4 performs a scene-change recognition in such a way that, possibly, greatly different image contents are determined for these two consecutive images. The switch 3 is controlled by means of the output signal of the circuit block 4 for scene-change recognition.

The circuit arrangement shown in FIG. 4 further includes a circuit block 5 for time-sequential segment tracing. The data of the images $I_n$ and $I_{n-1}$ are applied to the input of the circuit block 5. The output signal is applied to the switch 3.

The switch controlled by means of the output signal of the circuit block 4 for scene-change recognition may be switched to the output signal of the circuit block 2 for segmentation or the circuit block 5 for time-sequential segment tracing. Dependent on this switching operation, one of the two output signals of the block 2 or of the block 5 is applied to an output 6 of the circuit arrangement. This output signal of the switch 3 is additionally applied to a delay stage 7, whose output signal is applied to the circuit block 5 for time-sequential segment tracing and to the circuit block 1 for motion estimation. Moreover, the output signal of the circuit block 1 is applied to the circuit block 5 for time-sequential segment tracing.

The circuit block 4 for scene-change recognition indicates whether consecutive images have basically similar image contents or not. If similar image contents are present, possibly moving regions between consecutive images may be iterated by means of motion estimation. However, if the image contents of consecutive images $I_n$ and $I_{n-1}$ differ considerably, then there is most probably a change of scenes. The image $I_n$ must then be completely resegmented, i.e. new regions are formed.

This is realized by means of the circuit block 2 for segmentation.

Dependent on the result of recognizing a change of scenes, the switch 3 may be connected to the output signal of the circuit block 2 for segmentation. This output signal is applied to the output 6 so that the segments, i.e. the regions of the image $I_n$, are present at the output 6.

If it is assumed for the subsequent image $I_{n+1}$ that it is similar to the image contents $I_n$, such that regions having a displaced position in the image $I_{n+1}$ with respect to the image $I_n$, can be found again, the switch 3 is changed over to the output signal of the block 5 for time-sequential segment tracing.

After delay by means of the delay stage 7, the region division present in the signal at the output 6 is applied to the circuit block 1 for motion estimation. By means of this circuit block 1, the motion of the regions found in the image $I_n$ relative to the image $I_{n+1}$ is determined. In this way, the new position of such regions which are only displaced with respect to the image $I_n$ is found in the image $I_{n+1}$. For the purpose of consistency of this motion estimation, the determined motion may be compared with the motion of the same regions between the images $I_{n-1}$ and $I_n$. The motion estimation is considered to be valid only when there is a consistent motion between these three images.

Both the output signal of the circuit block 1 for motion estimation and the region data delayed by means of the delay stage 7 for the image $I_n$ are applied to the circuit block 5 for time-sequential segment tracing. Regions present at unchanged positions in the image $I_{n+1}$ and the regions at displaced positions found by means of the circuit block 1 can be traced by means of the circuit block 5. This means that these regions are taken over for the image $I_{n+1}$ by the circuit block 5. If necessary, those image areas which are not covered by the displaced regions or those image areas associated with a region in the image $I_n$ and not found in the image $I_{n+1}$, i.e. a region which is lost, may be added to new regions by means of the circuit block 5. For this purpose, new regions can be formed, or the pixels may be added to already existing regions.

Moreover, the consistency of all regions, particularly of newly formed regions may be checked in the circuit block 5. This means that it can be checked whether adjacent regions are united, whether given pixels can be added to one of the known regions, or whether too small regions are dissolved, etc.

The data of the regions which have been taken over and possibly also the data of the newly formed regions are applied for the image $I_{n+1}$ as an output signal to the output 6 of the circuit arrangement via the switch 3. This provides the possibility of taking over the regions from the image $I_n$, at least for essential parts of the image contents which may also be subject to a motion.

This process is repeated, for example, for the image $I_{n+2}$ in a similar way.

The switch 3 resumes its position in which it is switched to the output signal of the circuit block 2 for new segmentation only when the circuit block 4 for scene-change recognition determines considerably different image contents in consecutive images. A new segmentation is then performed for this image. If no scene change is detected for the next image, the switch is switched to the output signal of the circuit block 5 for time-sequential segment tracing again and a time-sequential iteration of regions in consecutive images is performed for the next image or for further images.

What is claimed is:

1. A method of segmenting time-sequential images of a picture signal, comprising the steps of:
   splitting each of the images up into regions during segmentation;
   associating adjacent pixels having similar luminance and/or chrominance values with each of the regions;
   retracing regions of an image $I_n$ in a subsequent image $I_{n+1}$ by performing a motion estimation of the regions of the image $I_n$;
   determining a new position for each of the regions in the image $I_{n+1}$ with reference to motion vectors determined for each region by means of the motion estimation in order to produce displaced regions;
   adapting the displaced regions to the image contents of the image $I_{n+1}$;
   adding pixels of the image $I_{n+1}$ not covered by the adopted regions to one of the adopted regions or to newly formed regions.

2. A method as claimed in claim 1, wherein, if several pixels of the image $I_n$ are imaged on a pixel in the image $I_{n+1}$ on the basis of motion of their regions, it is determined for each pixel which of the moved regions said pixel matches best in the image $I_{n+1}$ as regards its luminance and/or chrominance values.

3. A method as claimed in claim 1, wherein the motion vectors determined for the images $I_n$ and $I_{n+1}$ are compared with motion vectors additionally determined for the images $I_{n-1}$ and $I_n$, and in that, if significantly different motion vectors have been determined for a region during both motion estimations, the motion vectors for this region are considered to be invalid and the pixels of this region are added to one of the other displaced regions or to newly formed regions.

4. A method as claimed in claim 1, wherein it is checked for each pixel located at a border of its region whether its luminance and/or chrominance values are more similar to those pixels of a region with which its left, right, upper or lower neighbor is associated, and in that the pixel is possibly added to a found and better matching region.

5. A method as claimed in claim 1, wherein a merger of regions having similar luminance and/or chrominance values is performed for regions which are newly formed in the image $I_{n+1}$.

6. A method as claimed in claim 1, wherein regions falling below a predetermined minimum size are dissolved, and in that their pixels are added to other, possibly matching regions.

7. A method as claimed in claim 6, wherein the minimum size for regions which are newly formed in the image $I_{n+1}$ is larger than for displaced regions which have been taken over from the image $I_n$.

8. A method as claimed in claim 1, wherein each region in the image $I_{n+1}$, which has resulted from a displacement from a region of the image $I_n$, is compared with its neighbors of the image $I_n$, and in that regions are combined with equal or similar regions of the image $I_n$.

9. A method as claimed in claim 1, wherein, before forming new regions in the image $I_{n+1}$, an edge detection is performed with reference to the pixel values which are not associated with any of the regions displaced with respect to the image $I_n$, and in that, after formation of the new regions, pixels forming an edge are added to those new regions which they match best as regards their luminance and/or chrominance values.

10. A method as claimed in claim 1, wherein a change of scenes is recognized in such a way that no motion estimation is performed and exclusively new regions are formed when the image contents of the image $I_{n+1}$ deviate considerably from the image $I_n$.

11. A circuit arrangement for performing the method as claimed in claim 1, wherein the circuit arrangement comprises means (1) for motion estimation which receive the data of the regions of an image $I_n$ and perform a motion estimation of the formed regions with reference to the data of the subsequent image $I_{n+1}$.

* * * * *